United States Patent

Heinz et al.

[11] Patent Number: 6,106,005
[45] Date of Patent: Aug. 22, 2000

[54] SIDE IMPACT PROTECTION DEVICE FOR AN OCCUPANT OF A VEHICLE

[75] Inventors: Martin Heinz, Stuttgart; Fred Trick, Rutesheim; Herbert Bögge, Wiernsheim; Günter Dietrich, Frieberg; Hermann Guhl, Rottenburg, all of Germany

[73] Assignee: Dr. Ing. h.c.F. Porsche AG, Weissach, Germany

[21] Appl. No.: 09/080,248

[22] Filed: May 18, 1998

[30] Foreign Application Priority Data

May 16, 1997 [DE] Germany .................. 197 20 587

[51] Int. Cl.⁷ .................................................. B60R 21/16
[52] U.S. Cl. ...................................... 280/730.2; 280/728.2
[58] Field of Search .................... 280/728.2, 728.3, 280/730.2

[56] References Cited

U.S. PATENT DOCUMENTS

| | | | |
|---|---|---|---|
| 5,062,664 | 11/1991 | Bishop et al. | 280/743 |
| 5,195,774 | 3/1993 | Morita | 280/731 |
| 5,224,732 | 7/1993 | Warner et al. | 280/730 |
| 5,431,436 | 7/1995 | Mossi et al. | 280/728.1 |
| 5,536,041 | 7/1996 | Acker et al. | 280/740 |
| 5,669,627 | 9/1997 | Marjanski et al. | 280/728.3 |
| 5,692,774 | 12/1997 | Acker et al. | 280/729 |
| 5,803,490 | 9/1998 | Seventko et al. | 280/730.2 |

FOREIGN PATENT DOCUMENTS

| | | |
|---|---|---|
| 0 363 986 | 4/1990 | European Pat. Off. . |
| 0 523 704 | 1/1993 | European Pat. Off. . |
| 0 711 627 | 5/1996 | European Pat. Off. . |
| 33 15 535 | 3/1984 | Germany . |
| 41 01 286 | 7/1992 | Germany . |
| 43 09 925 | 10/1993 | Germany . |
| 42 14 662 | 11/1993 | Germany . |
| 94 08 908 | 1/1995 | Germany . |
| 44 36 130 | 3/1995 | Germany . |
| 44 10 889 | 10/1995 | Germany . |
| 44 30 412 | 10/1995 | Germany . |
| 195 11 511 | 2/1996 | Germany . |
| 295 17 372 U | 3/1996 | Germany . |
| 44 43 027 | 6/1996 | Germany . |
| 195 05 214 | 8/1996 | Germany . |
| 296 08 055 U | 8/1996 | Germany . |
| 195 35 430 | 3/1997 | Germany . |
| 6-227348 | 8/1994 | Japan . |
| 2 293 355 | 3/1996 | United Kingdom . |

*Primary Examiner*—Paul N. Dickson
*Assistant Examiner*—Faye M. Fleming
*Attorney, Agent, or Firm*—Evenson, McKeown, Edwards & Lenahan, P.L.L.C.

[57] ABSTRACT

A side impact protection device for an occupant of a vehicle has an installation module including at least a housing, a gas generator, and a gas bag. The module is mounted on a door interior panel, with an outlet opening for the inflated gas bag being provided on an upright wall section of door trim located in front. For improved utilization of the existing door cavity and to achieve a rigid connection between the housing and the door interior panel, the housing has a trough-shaped receiving section for the gas generator, an expulsion channel located in front for the gas bag, and a panel-shaped mounting section. The receiving section passes through a recess in the door interior panel and penetrates into the door cavity located behind.

15 Claims, 3 Drawing Sheets

SIDE IMPACT PROTECTION DEVICE FOR AN OCCUPANT OF A VEHICLE

CROSS-REFERENCE TO RELATED APPLICATIONS

This application is related to application Ser. No. 09/079,389 filed on May 15, 1998 in the name of Martin Heinz et al. for SIDE IMPACT PROTECTION DEVICE FOR AN OCCUPANT; application Ser. No. 09/079,388 filed on May 15, 1998 in the name of Martin Heinz et al. for SIDE IMPACT PROTECTION DEVICE FOR AN OCCUPANT; application Ser. No. 09/080,207 filed on May 18, 1998 in the name of Martin Heinz et al. for SIDE IMPACT PROTECTION DEVICE FOR AN OCCUPANT; the subject matter of which is incorporated herein by reference.

BACKGROUND AND SUMMARY OF THE INVENTION

This application claims the priority of German application 197 20 587.9, filed in Germany on May 16, 1997, the disclosure of which is expressly incorporated by reference herein.

The invention relates to a side impact protection device in the form of an inflatable gas bag for an occupant of a vehicle, with an installation module consisting of at least a housing, a gas generator, and a gas bag being mounted on an internal door panel of a side door and an outlet opening for the inflated gas bag being provided on an upright wall section of door trim located in front of it.

A known side impact protection device of the type generally described above is known from German patent document DE 195 11 511 A1, in which the bottom of the housing is placed on the side of the door interior panel facing the occupant and is fastened by external mounts on the door interior panel. The door interior panel is designed to be relatively flexible in the mounting area of the housing, so that it can bend easily when the gas cushion unfolds. To accommodate the installation module that consists of a housing, a gas generator, and a gas bag, a relatively large cavity must be left between the door interior panel and the inside door trim, thus limiting the free design of the door trim. There is also the danger that the gas bag will be damaged on the relatively sharp-edged borders of the housing as it inflates.

A goal of the invention is to improve a housing for a side impact protection device and the adjoining door interior panel such that the existing cavity in the door is better utilized and, when the housing is installed, a more rigid connection is provided between the housing and the interior door panel.

According to the invention this and other goals have been achieved by providing a housing, a gas generator, and an inflatable gas bag mounted on an interior door panel of a side door of the vehicle, an outlet opening for the inflatable gas bag being provided on an upright wall section of door trim, wherein said housing has a trough-shaped receiving section to mount the gas generator, an expulsion channel located in front for the gas bag, and a plate-shaped mounting section located therebetween and aligned approximately perpendicularly to the expulsion channel to secure the housing to the interior door panel, said receiving section being guided through a recess in the interior door panel and projecting into a door cavity located behind.

According to the invention this and other goals have been achieved by providing an arrangement for mounting a gas bag in a side door of a vehicle, comprising an interior door panel defining a recess; and a housing for receiving the gas bag, said housing including a flanged mounting section connected to said interior door panel proximate said recess, an expulsion channel extending from said mounting section toward a vehicle interior side, and a trough-shaped receiving section extending from said mounting section through said recess into a door cavity on a vehicle exterior side.

According to the invention this and other goals have been achieved by providing a method of mounting a gas bag in a side door of a vehicle, comprising the steps of: providing an interior door panel with a recess defined therein; providing a housing for receiving the gas bag, said housing including a flanged mounting section, an expulsion channel extending in a first direction from said mounting section, and a trough-shaped receiving section extending from said mounting section essentially opposite said first direction; and connecting said housing to said interior door panel proximate said recess via said flanged mounting section, such that said expulsion channel extends toward a vehicle interior side and said trough-shaped receiving section extends through said recess into a door cavity on a vehicle exterior side.

The primary advantages achieved by the invention consist in the fact that the housing that consists of a trough-shaped receiving section for the gas generator, an expulsion channel located in front of it for the gas bag, and a panel-shaped mounting section, has a relatively rigid structure, so that because the receiving section projects at least partially through a recess in the door interior panel into the door cavity located behind, the cavity in the body of the door that extends in the direction of the door window is also utilized to accommodate the installation module.

The door section formed by the recess is very rigid because of the edgewise offset of the interior panel of the door in conjunction with the window shaft reinforcement located above. The expulsion channel is made rigid by locally mounted beads and the surrounding bead. The beads also protect the gas bag against damage when it inflates. The door trim is not subjected to a load when the gas bag unfolds because the expulsion channel is rigid. In addition, the expulsion channel serves to guide the gas bag past the door trim. The housing is mounted on the door sealing film. When the gas bag is inflated, the interior panel of the door is not deformed. The replacement latch on the housing that is provided integrally with the module ensures that the installation module is correctly installed on the corresponding side door. A plug for the gas generator can also be mounted on the housing.

Other objects, advantages and novel features of the present invention will become apparent from the following detailed description of the invention when considered in conjunction with the accompanying drawings.

DETAILED DESCRIPTION OF THE DRAWINGS

Figure 1:
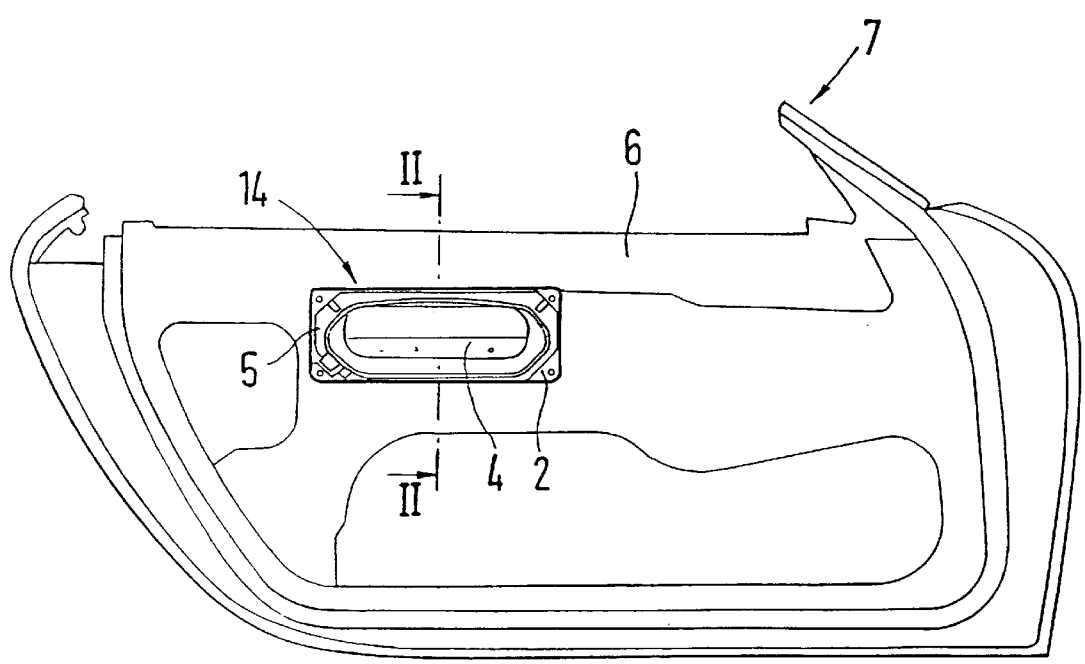
FIG. 1 is a side view of a vehicle door as viewed from the inside of an interior panel of a door, with an installation module for a side impact protection device according to a preferred embodiment being mounted on the interior panel of the door.

A side impact protection device 1 for an occupant of a vehicle comprises an installation module consisting of a housing 2, a gas generator 3, and a folded gas bag 4, said module being fastened to an interior panel 6 of a side door 7.

An outlet opening 10 for the inflated gas bag 4 is provided on an upright wall section 8 of door trim 9 located in front, with outlet opening 10 in the embodiment being covered by a two-part cover 11. When gas bag 4 is inflated, the lid halves are pivoted into a release position, with half 12 pivoting downward and the other lid half 13 pivoting upward.

A rectangular recess 14 is provided to accommodate installation module 5 in an upper area of door interior panel 6, a short distance below the belt line, with the longer sides of rectangular recess 14 extending in the lengthwise direction of side door 7 and the shorter sides extending in the vertical direction of side door 7.

Housing 2 of installation module 5 comprises an elongate, trough-shaped receiving section 15 for gas generator 3, formed by an elongate tubular generator, an expulsion channel 16 located in front of it for gas bag 4, and a panel-shaped mounting section 17 aligned approximately vertically with respect to expulsion channel 16 for mounting housing 2 on door interior panel 6.

As viewed in the transverse direction of the vehicle, upright mounting section 17 extends approximately in the center between expulsion channel 16 and receiving section 15.

According to the invention, receiving section 15 is guided through recess 14 of interior panel 6 of the door and projects into door cavity 18 located behind. The height-adjustable window 19 travels inside the door cavity at a distance from receiving section 15. For reasons of rigidity, door interior panel 6 at least areawise has a rounded offset 20 at the edge of recess 14 that extends in the direction of door window 19. Housing 2 is installed from the inside on a door sealing film 21 that is glued to door interior panel 6 and is held in place on door interior panel 6 by means of mounting screws 22, said screws being provided at the corners of the approximately rectangular mounting section 17. Mounting screws 22 are guided through openings 37 in mounting section 17 and are screwed into weld nuts or plug nuts 38 located in the door (FIG. 2).

Figure 2:
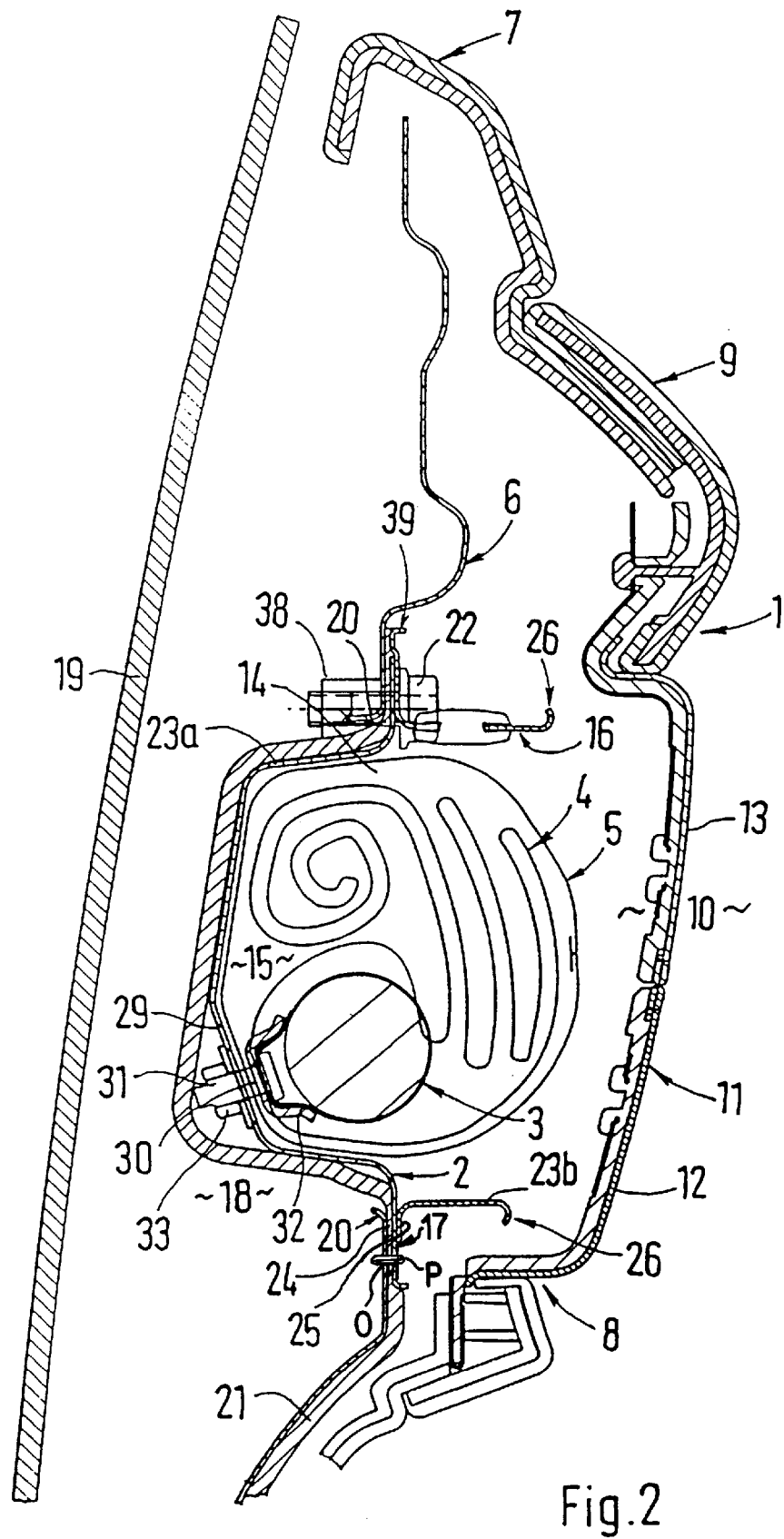
FIG. 2 is an enlarged section along line II—II in FIG. 1.
Figure 3:
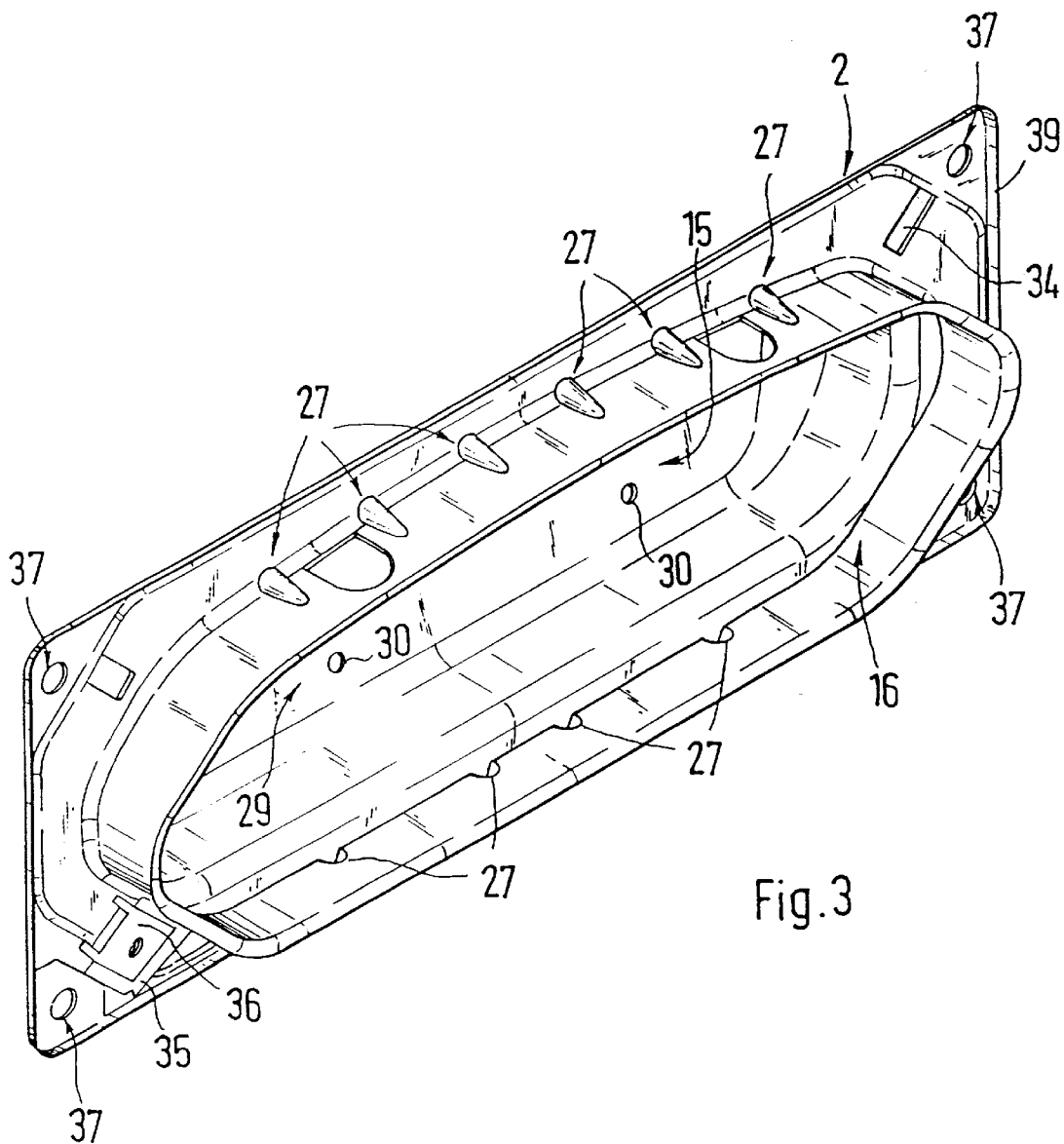
FIG. 3 is an enlarged diagonal perspective view from the inside of the housing of the installation module.

According to FIG. 2, housing 2 consists of a lower part 23a and an upper part 23b connected therewith. The trough-shaped receiving section 15 that is relatively narrow in the vertical direction is formed on lower part 23a, while expulsion channel 16 is provided on upper part 23b. Flanges 24, 25 that extend in the same direction and are connected with one another by welds on upper part 23b and lower part 23a form panel-shaped mounting section 17 that has a surrounding reinforcing offset 39 at its outer end. Expulsion channel 16 is provided on the side that faces outlet opening 10 all the way around with an outwardly directed offset or bead 26. As a result, gas bag 4 is protected against damage when inflated. The inflated gas bag 4 is guided past door trim 9 through expulsion channel 16. In addition, expulsion channel 16 is provided at top and bottom in the area where it connects with mounting section 17 with a plurality of adjacent reinforcing beads 27, creating a rigid expulsion channel 16. Housing 2 in the embodiment is made of sheet steel. Housing 2 however could also be made in one piece from die-cast aluminum.

At the lower edge of mounting section 17, at least one projecting pin P is provided on the side facing door interior panel 6, said pin P engaging a matching opening O in door interior panel 6 when housing 2 is installed (protection against incorrect installation, not shown in greater detail). At a bottom 29 of receiving section 15, bores 30b are provided locally through which mounting elements (threaded bolts 31) of a generator mount 32 located inside housing 2 are inserted. On the outside, washers and nuts 33 are mounted on threaded bolts 31. Outside expulsion channel 16, at one end area of mounting section 17, a rectangular opening 34 is provided at which a plug, not shown in greater detail, of a line that runs to gas generator 3 can be inserted and be secured against twisting.

Diagonally opposite opening 34, a mount 35 with a plug nut 36 is likewise provided outside expulsion channel 16 on housing 2, on which nut cover 11 located in front can be secured by a mounting screw.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device for an occupant of a vehicle, comprising a housing, a gas generator, and an inflatable gas bag mounted on an interior door panel of a side door of the vehicle, an outlet opening for the inflatable gas bag being provided on an upright wall section of door trim, wherein said housing has a trough-shaped receiving section to mount the gas generator, an expulsion channel located in front for the gas bag, and a mounting section located therebetween and aligned approximately perpendicularly to the expulsion channel to secure the housing to the interior door panel, said receiving section being guided through a recess in the interior door panel and projecting into and spaced from a bottom of a door cavity located behind the interior door panel.

2. A side impact protection device according to claim 1, wherein the housing consists of a lower part and of an upper part connected therewith, with the trough-shaped receiving section being formed on the lower part and the expulsion channel being formed on the upper part, and the mounting section being formed by flanges running in the same direction on the upper part and the lower part.

3. A side impact protection device according to claim 1, wherein the expulsion channel is provided with an outwardly directed circumferential offset or bead all the way around on a side facing outlet opening.

4. A side impact protection device according to claim 1, wherein the expulsion channel is provided with reinforcing beads.

5. A side impact protection device according to claim 1, wherein the housing is made of sheet steel.

6. A side impact protection device according to claim 1, wherein at least one projecting pin is provided on the mounting section on the side facing the interior door panel, said pin engaging a matching opening in the interior door panel.

7. A side impact protection device according to claim 1, wherein the interior door panel has an offset at the edge of the recess that is rounded and extends toward a window in the side door.

8. A side impact protection device according to claim 1, wherein bores are provided on a bottom of the receiving section, through which bores mounting elements to hold the gas generator and the gas bag can be passed.

9. A side impact protection device according to claim 1, wherein said housing, as viewed in the vertical direction, is designed to have a relatively flat structure.

10. A side impact protection device according to claim 1, wherein a mount with a plug nut is provided outside the expulsion channel on the mounting section, on which mount a cover located in front can be fastened via a mounting screw.

11. A side impact protection device according to claim 1, wherein the housing is made in one piece and is manufactured from die-cast aluminum.

12. An arrangement for mounting a gas bag in a side door of a vehicle, comprising:

an interior door panel defining a recess disposed inwardly of a door window; and a housing for receiving the gas bag, said housing including a flanged mounting section connected to said interior door panel proximate said recess, an expulsion channel extending from said mounting section toward a vehicle interior side, and a trough-shaped receiving section extending from said mounting section through said recess into a door cavity on a vehicle exterior side of the interior door panel.

13. A method of mounting a gas bag in a side door of a vehicle, comprising the steps of:

providing an interior door panel with a recess defined therein which in use is disposed facing a door panel space;

providing a housing for receiving the gas bag, said housing including a flanged mounting section, an expulsion channel extending in a first direction from said mounting section, and a trough-shaped receiving section extending from said mounting section essentially opposite said first direction; and connecting said housing to said interior door panel proximate said recess via said flanged mounting section, such that said expulsion channel extends toward a vehicle interior side and said trough-shaped receiving section extends through said recess into a door cavity on a vehicle exterior side of the interior door panel which faces the door panel space.

14. A vehicle side door assembly comprising:

an interior door panel which on one side faces a vehicle passenger space and on an opposite side faces a hollow door space, an opening in said interior door panel, a housing flangedly connected to the interior door panel and protruding through said opening, a gas bag and gas generator disposed in said housing, a gas bag cover assembly connected to the interior door panel and operable to open and permit expansion of the air bag into the passenger space, and an expulsion channel operable to guide expanding movement of the air bag in a direction toward the cover assembly, wherein the housing and expulsion channel are connected with one another and the interior door panel at a housing flange surrounding the housing, said housing extending toward and spaced from an opposite side of said hollow space when in an in use position, said expulsion channel extending from the housing toward and spaced from the cover assembly.

15. An assembly according to claim 14, wherein the hollow door space accommodates a door window, and wherein said housing is spaced from said window when spaced from said window when in a use position with a window in the hollow door space.

* * * * *